(12) United States Patent
Vasishth et al.

(10) Patent No.: US 7,548,923 B2
(45) Date of Patent: Jun. 16, 2009

(54) SYNC CONFIGURATION AND DISCOVERY SUPPORT

(75) Inventors: Himanshu Vasishth, Seattle, WA (US); John Spencer Schenken, Redmond, WA (US); Jeff Currier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 11/620,241

(22) Filed: Jan. 5, 2007

(65) Prior Publication Data

US 2008/0168105 A1 Jul. 10, 2008

(51) Int. Cl.
*G06F 17/30* (2006.01)
*G06F 15/177* (2006.01)
*G06F 15/173* (2006.01)

(52) U.S. Cl. .................. 707/10; 715/735; 709/223

(58) Field of Classification Search ............ 707/1, 707/103 R, 104.1; 709/204, 205, 218, 245; 705/37; 704/270.1; 715/734, 764
See application file for complete search history.

(56) References Cited

U.S. PATENT DOCUMENTS

| | | | |
|---|---|---|---|
| 5,428,791 | A | 6/1995 | Andrew et al. |
| 5,758,154 | A | 5/1998 | Qureshi |
| 6,360,331 | B2 | 3/2002 | Vert et al. |
| 6,697,852 | B1 | 2/2004 | Ryu |
| 6,769,031 | B1 | 7/2004 | Bero |
| 7,003,463 | B1 * | 2/2006 | Maes et al. .............. 704/270.1 |
| 7,222,302 | B2 * | 5/2007 | Hauser et al. ............... 715/734 |
| 2002/0013759 | A1 * | 1/2002 | Stewart et al. ................. 705/37 |
| 2003/0031188 | A1 | 2/2003 | Ishibashi |
| 2004/0172423 | A1 | 9/2004 | Kaasten et al. |
| 2005/0076329 | A1 | 4/2005 | Hsu et al. |
| 2006/0010434 | A1 | 1/2006 | Herzog et al. |
| 2006/0037000 | A1 | 2/2006 | Speeter et al. |

OTHER PUBLICATIONS

White paper entitled "Auto Discovery: The potential to be a Key Component of Change and Configuration Management Strategy" for itSEC2005, Jan. 31, 2004, pp. 1-9 http://www.qaiindia.com/1.22%20Software%20Sector/ITSM_Practice/papers/adarsh_infy.pdf#search=%22%22the%20potential%20to%20be%20a%20key%20component%22%2Bpdf%22.

Ramanathan, S. et al, "Auto-Discovery Capabilities for Service Management: An ISP Case Study," May 1999, pp. 1-18 http://www.hpl.hp.com/techreports/1999/HPL-1999-68.pdf#search=%22%22Auto-Discovery%20Capabilities%20for%20Service%20Management%3A%20An%20ISP%20Case%20Study%22%2Bpdf%22.

Goldsack, P., et al, "SmartFrog: Configuration and Automatic Ignition of Distributed Applications," May 29, 2003, pp. 1-9 http://www.hpl.hp.com/research/smartfrog/papers/SmartFrog_Overview_HPOVA03.May.pdf.

* cited by examiner

*Primary Examiner*—Apu M Mofiz
*Assistant Examiner*—Susan Y Chen
(74) *Attorney, Agent, or Firm*—Workman Nydegger/Microsoft

(57) ABSTRACT

Various illustrative examples of a synchronization mechanism are described. A synchronization schema may be adopted to allow an application to save configuration details for a synchronization operation in a format which may easily be discovered by other applications without the need of a registration/de-registration mechanism. The synchronization mechanism may be executed in response to user entered parameters specifying the type and other characteristics of operation.

15 Claims, 6 Drawing Sheets

SYNC CONFIGURATION AND DISCOVERY SUPPORT

FIELD OF THE INVENTION

Aspects of the present invention relate to a user interface and associated functionality in a computer system for creating and maintaining relationships between data objects stored on the system.

BACKGROUND

Computer systems, in general, are used to store and maintain programs and data. A computer operates by executing a program, or a sequence of instructions, to carry out one or more tasks. Tasks, when executed, frequently serve to modify the stored data. Examples of modifications include altering the data value, moving data from one storage location in the computer to another, or deleting the data entirely from the system.

Data manipulation and management is a relatively easy task when isolated to a single computing platform. In the instance of a single computer, an executable program or application only needs to obtain write access rights to the data of interest in order to preserve modifications brought about as a result of execution. Advancements in technology, particularly the advent of networked computing, brought about a multitude of new challenges as it relates to data maintenance. Networked computing topologies provide an efficient basis to enable users to access and share vast amounts of data, but this enhancement is accompanied by added complexity with respect to ensuring that data remains consistent between the terminals that reside on the network.

In an effort to resolve the issue of potential data inconsistency, software has been engineered to provide for a synchronization process, wherein discrepancies or modifications between data objects are identified and ultimately reconciled. Prior methods of synchronization have entailed requiring an application to register its configuration information with a central service in order to allow other applications to invoke it. Such methods prove to be burdensome, however, because they require the allocation and maintenance of resources to serve as a centralized store for such registration information. Furthermore, when synchronization is no longer required, the additional step of de-registration is required, or the registration entry will continue to consume resources within the registry. As such, a system and method are desired that enable saving the configuration details for a synchronization operation without the need of a registration mechanism. Furthermore, it is desirable that other applications will easily be able to discover the configuration details associated with an application.

SUMMARY

This summary is provided to introduce a selection of concepts in a simplified form that are further described below in the Detailed Description. This summary is not intended to identify key features or essential features of the claimed subject matter, and instead presents various illustrative aspects described herein.

In light of the foregoing, aspects of the present invention are directed to a schema that allows an application to save the configuration details for a synchronization operation in a format that may easily be discovered by other applications. In accordance with at least one aspect of the present invention, a means of enabling synchronization without requiring an application to register configuration information with a centralized service is provided.

Another aspect of the present invention provides a means of establishing a relationship between application(s) and/or data object(s) that require synchronization. Still another aspect of the present invention provides synchronization based on the properties of the subject application(s) and/or data object(s) that require synchronization.

BRIEF DESCRIPTION OF THE DRAWINGS

The foregoing summary, as well as the following detailed description, is better understood when read in conjunction with the accompanying drawings, which are included by way of example, and not by way of limitation and in which like reference numerals indicate similar elements.

DETAILED DESCRIPTION

In the following description of various illustrative examples, reference is made to the accompanying drawings, which form a part hereof, and in which is shown by way of illustration various examples in which features may be practiced. It is to be understood that other examples may be utilized and structural and functional modifications may be made.

Illustrative Operating Environment

Figure 1:
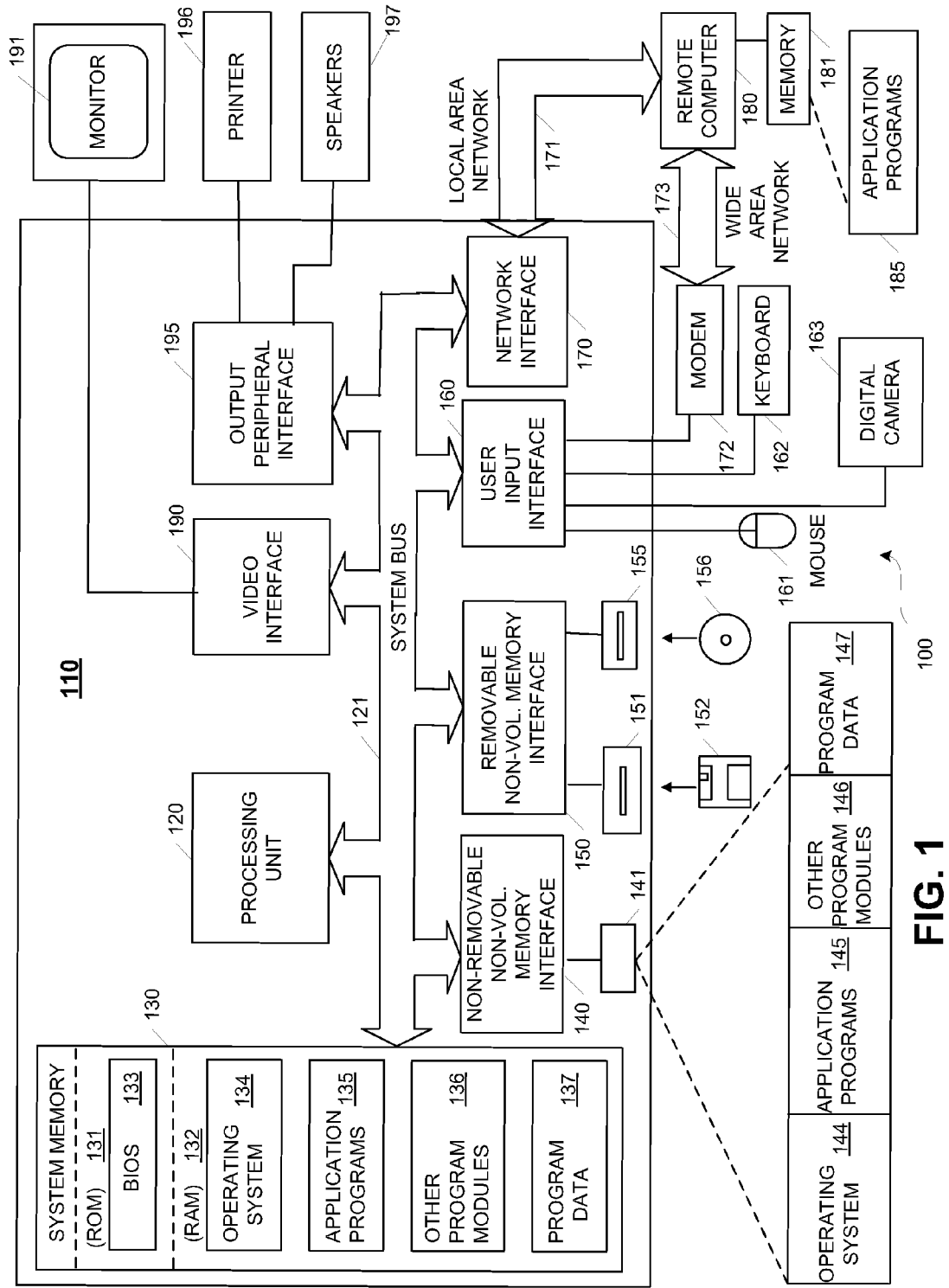
FIG. 1 illustrates a schematic diagram of a general-purpose digital computing environment in which certain aspects may be implemented.

FIG. 1 illustrates an example of a suitable general purpose computing system environment 100 on which one or more illustrative aspects may be implemented. The computing system environment 100 is only one example of a suitable computing environment and is not intended to suggest any limitation as to the scope of use or functionality of features described herein. Neither should the computing environment 100 be interpreted as having any dependency or requirement relating to any one or combination of components illustrated in the exemplary operating environment 100.

Aspects are operational with numerous other general purpose or special purpose computing system environments or configurations. Examples of well known computing systems, environments, and/or configurations that may be suitable for use with aspects of the invention include, but are not limited to, personal computers; server computers; mobile phones; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing one or more aspects of the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may include computer storage media and communication media. Computer storage media includes both volatile and nonvolatile and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include electronic pen (e.g., a stylus), a microphone, joystick, game pad, satellite dish, scanner, or the like. These and other input devices are often connected to the processing unit 120 through a user input interface 160 that is coupled to the system bus 121, but may be connected by other interface and bus structures (not shown), such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, computer 110 may be connected to a mobile terminal (not shown) which is configured to send and receive transmissions based on the Bluetooth standard, through a specific Bluetooth module. Additionally, computer 110 may also be configured to receive, decode and process transmissions with a remote computer 180 or mobile terminal through an FM/AM radio receiver, wireless local area network (WLAN) transceiver, and/or telecommunications transceiver.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates application programs 185 as residing on memory device 181. It will be appreciated that the network connections shown are exemplary and other means of establishing a communications link between the computers may be used.

One or more aspects of the invention may be embodied in computer-executable instructions (i.e., software), such as in a notification manager software object, routine or function (collectively referred to herein as a notification manager) stored in system memory 130 or non-volatile memory 141, 152, 156 as application programs 135, 145, program modules 136, 146, and/or program data 137, 147. The software may alternatively be stored remotely, such as on remote computer 180 with application programs 185. Generally, program modules include routines, programs, objects, components, data structures, etc. that perform particular tasks or implement particular abstract data types when executed by a processor in a computer or other device. The computer executable instructions may be stored on a computer readable medium such as a hard disk 141, optical disk 156, removable storage media 152, solid state memory, RAM 132, etc. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like.

Illustrative Aspects

Aspects of the present invention are described herein with reference to the Windows Future Storage (WinFS) application as manufactured by Microsoft® Corporation of Redmond, Wash., a component of the Windows operating system as manufactured by Microsoft® Corporation running on a personal computer (PC) or equivalent platform for illustrative purposes only. It should be understood by those skilled in the art that one or more other operating systems may be employed.

Many file systems found on common operating systems store files and objects as a stream of bytes, and have little or no information about the data stored in the files. Such systems are prohibitive in the sense that they limit organization of the files to folders and file names. More recent approaches have attempted to incorporate attributes, commonly referred to as metadata, to describe the contents of the file. While this more recent approach has facilitated searching, more complex approaches of aggregating data from two or more applications are still not supported. WinFS solves this problem by using attributes to describe both the data in files and the relation of that data with other data.

WinFS stores data in virtual locations, commonly termed stores. The utilization of these stores effectively eliminates the need for the more classical organization of a folder hierarchy, comprised of folders and corresponding subfolders. WinFS provides a unified storage but does not require a specific format with respect to the data or objects to be stored. Instead, it allows data to be written in application specific formats. In order to facilitate retrieval and searching operations, applications provide schema, or effective mapping mechanisms, that enable interpretation of a file format. In this manner, an application may read or write data to an object native to another application having its own distinct methods of formatting data. The incorporation of schema allows for the efficient sharing of data between two or more computers running different applications. This is particularly advantageous when the number of computers in a system is large, or where support for a particular computer or application has been discontinued. Thus, it is desirable to provide a schema that allows application(s) to save configuration details for a synchronization operation in a format which may be easily discovered by other applications without the need of a registration/deregistration mechanism.

Figure 2:
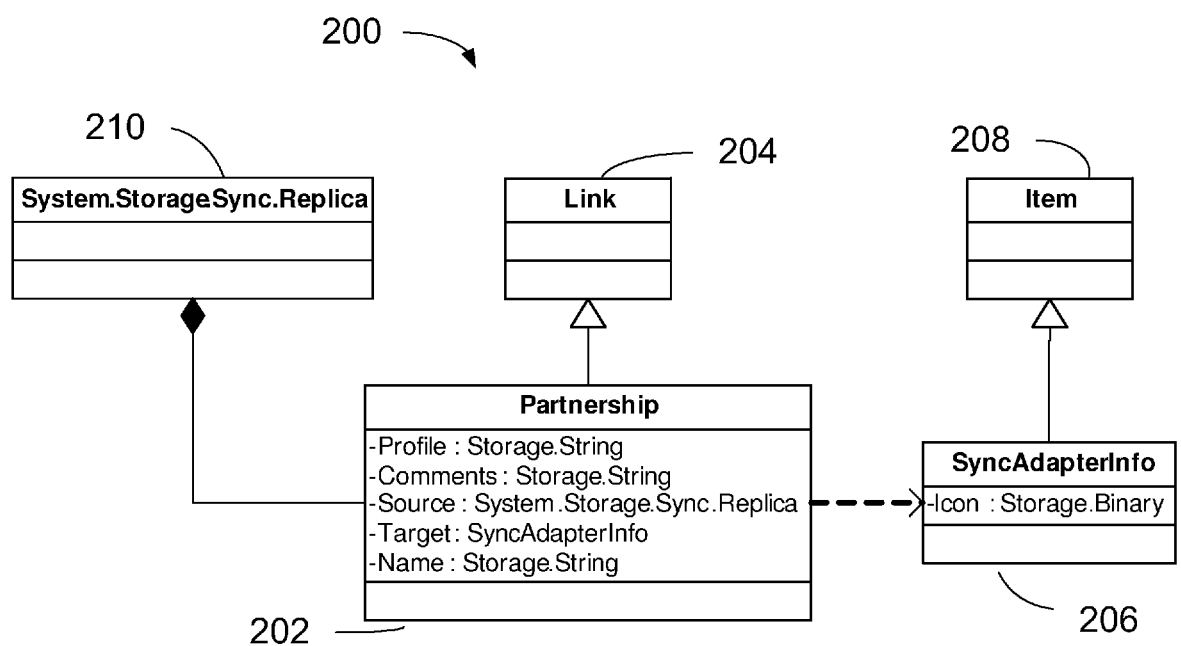
FIG. 2 is an example of an illustrative Unified Modeling Language (UML) diagram of schema elements used by a synchronization manager in accordance with at least one aspect of the present invention.

FIG. 2 demonstrates a UML data model 200 illustrates an example of a synchronization manager including various schema in accordance with at least one aspect of the present invention. The synchronization manager is responsible for overseeing the execution of one or more synchronization operations.

Partnership entity 202, derived from link 204, is used to capture the data necessary to support the notion of a partnership. A partnership may be described as a synchronization relation between a local repository 210, such as a WinFS repository, and a secondary data source. Generally stated, a partnership is a framework for synchronizing data items or objects between two or more data sources. Any place where data is kept, one may create a partnership to synchronize data with one's local computer.

Partnership entity 202 may include various attributes in order to facilitate appropriate operation. A 'Name' attribute may be used to capture the name of the partnership. A 'Profile' attribute may be used to capture the configuration profile for a secondary schema, which may be termed herein as a SyncAdapter, which is used to store the information specific to a particular method of communicating with a remote server. The configuration profile is ultimately made available to the SyncAdapter to facilitate SyncAdapter initialization. A 'Comments' attribute may be used to store one or more comments related to the partnership. A 'Source' attribute may represent the relationship between the partnership and replica 210. The partnership may be thought of as an extension to replica 210 providing additional information required in order to facilitate synchronization operations. A 'Target' attribute may represent the relationship between the partnership and an entity 206, such as SyncAdapterInfo entity 206.

SyncAdapterInfo entity 206, derived from item 208, may be used to capture details of one or more secondary schema that are configured for use by a synchronization manager. Entity 206 acts as a collection point for the information regarding the secondary schema implementations that have been installed. SyncAdapterInfo entity 206 may include information related to configuration of a secondary schema, such as what software (e.g., class) to invoke to create instances of partnerships that use that particular type of secondary schema. In the example shown in FIG. 2, SyncAdapterInfo entity 206 may include information providing an icon to facilitate (user) operation. Alternative examples may elect to expand the range of information contained in SyncAdapterInfo entity 206 without departing from the scope of the present invention.

Figure 3:
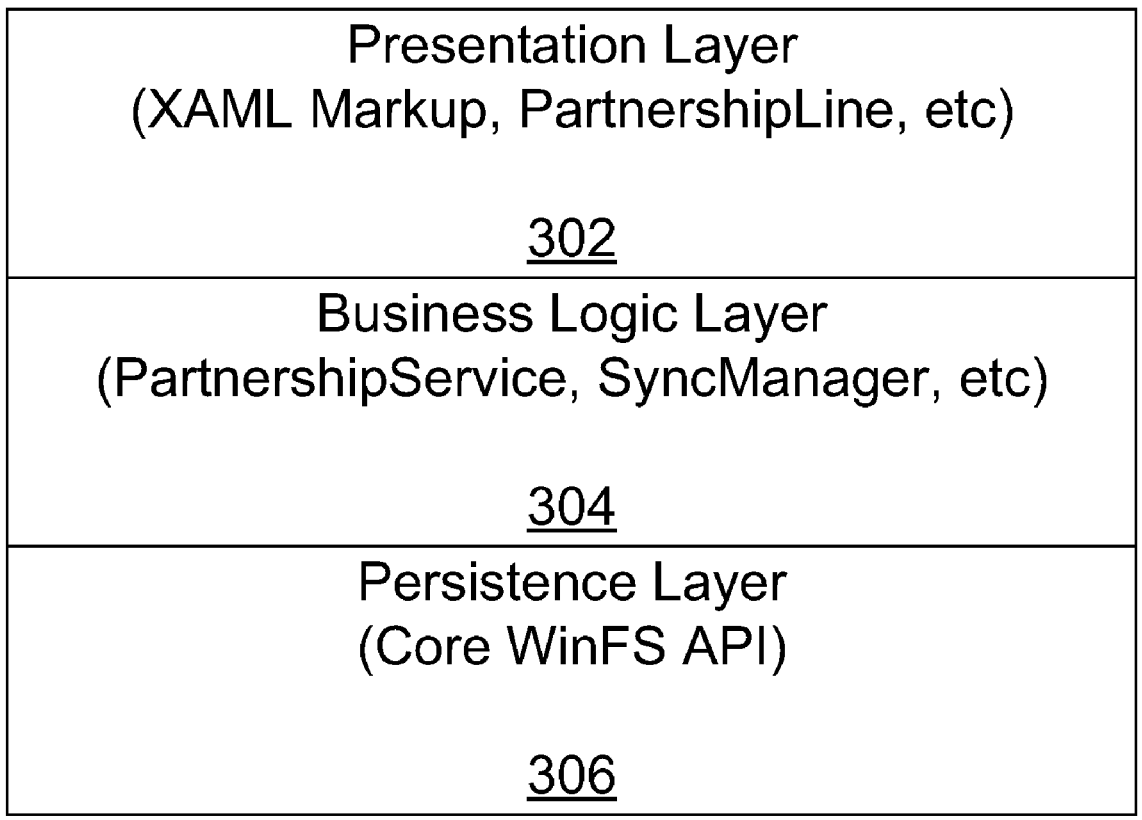
FIG. 3 is an example of layering that takes place within a synchronization manager in accordance with at least one aspect of the present invention.

FIG. 3 shows the layering 300 of an illustrative example of a synchronization manager application. Presentation layer 302 is where the core user interface components and runtime objects which are constructed to support them reside. Presentation layer 302 includes Extensible Application Markup Language (XAML) markup but also may include objects such as a PartnershipLine class, discussed herein below, to support data binding. In the illustrative example, presentation layer 302 interacts with a business logic layer 304.

Business logic layer 304 serves to add any additional logic or any higher level abstractions that may be required for presentation layer 302. Business logic layer 304 may include new services or objects, as well as new events or callbacks depending on the requirements of the area. Business logic layer 304 provides a veneer over persistence layer 306, connecting the entities together and performing any extra logic required when creating partnerships or beginning synchronization operations. Business logic layer 304 also provides for exception handling routines. Exceptions are consolidated into higher level exceptions and passed to presentation layer 302 for consumption.

Persistence layer 306 may include a core WinFS application programming interface (API) set. As should be understood by those skilled in the art, the API is the interface that allows requests for services to be made of it by other computer programs and/or to allow data to be exchanged. The API achieves this by providing access to functions without requiring access to the source code of the functions or libraries or requiring a detailed understanding of the functions' internal workings.

Figure 4:
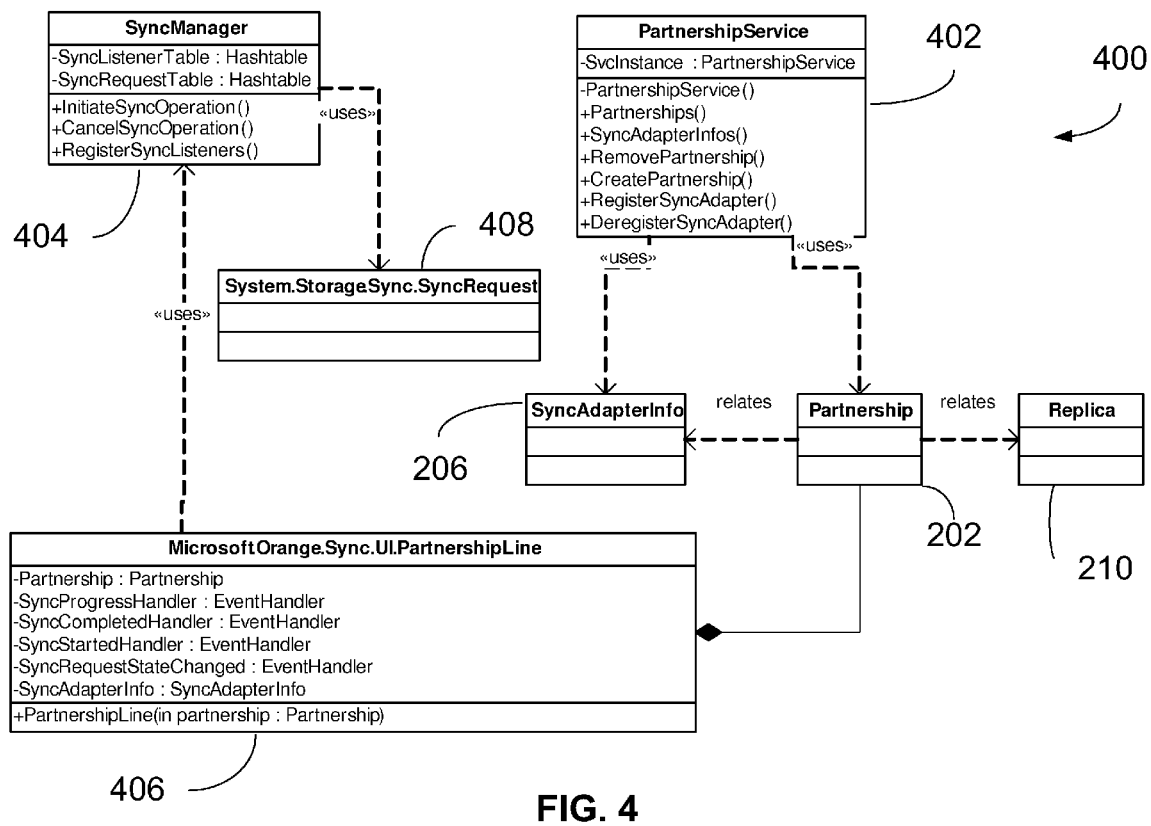
FIG. 4 is an example of a UML diagram of the core classes used by a synchronization manager in accordance with at least one aspect of the present invention.

FIG. 4 demonstrates via an illustrative UML model 400 the interaction of various core classes in a synchronization manager. PartnershipService class 402, operating in the business logic layer 304 of an application, provides operations allowing for the creation and destruction of Partnership 202 and SyncAdapterInfo 206 instances. PartnershipService class 402, as shown, may include a plurality of constructors and/or methods to facilitate functionality. For example, PartnershipService class 402 may include a constructor, similarly named PartnershipService. One of ordinary skill in the art should appreciate that a function of a constructor is to pre-define the data members of the class. PartnershipService class 402 also may include a method which returns all of the partnerships that are registered in the system to the caller. If none are registered then an empty collection instance is returned to the caller. Similarly, PartnershipService class 402 includes a method, such as RemovePartnership, to remove the passed in partnership instance from the system. A method, such as CreatePartnership, may be used to create partnership instances in an associated store. A method, such as RegisterSyncAdapter, when called, may create a new SyncAdapterInfo instance. A method, such as DeregisterSyncAdapter, may remove the corresponding passed in sync adapter.

SyncManager class 404 also operates within a business logic layer 304 and initiates or cancels the synchronization operations that take place in the system. SyncManager class 404 shields the presentation layer 302 from having direct knowledge of how the synchronization operations are taking place. As shown, SyncManager class 404 includes a method InitiateSyncOperation that may be used to initiate a synchronization operation. A method, such as CancelSyncOperation, may be used to cancel any synchronization operations that are in progress. A method, such as RegisterSyncListeners, may be called to register listeners to synchronization progress as it occurs.

PartnershipLine class 406 is a runtime object used by the user interface to surface the necessary properties in a single form, to facilitate ease in data binding within the user interface. In the illustrative example, PartnershipLine class 406 may include a similarly named method to achieve this functionality. A SyncRequest 408 may be used to store synchronization operation requests originating from SyncManager class 404.

As will be understood by one of ordinary skill in the art, the above classes and methods are provided by way of example, and not limitation. Functionality resident in the various classes and/or methods may be combined or aggregated without departing from the scope of invention. Similarly, classes and/or methods may be added or removed, again without departing from the scope of the invention.

Figure 5:
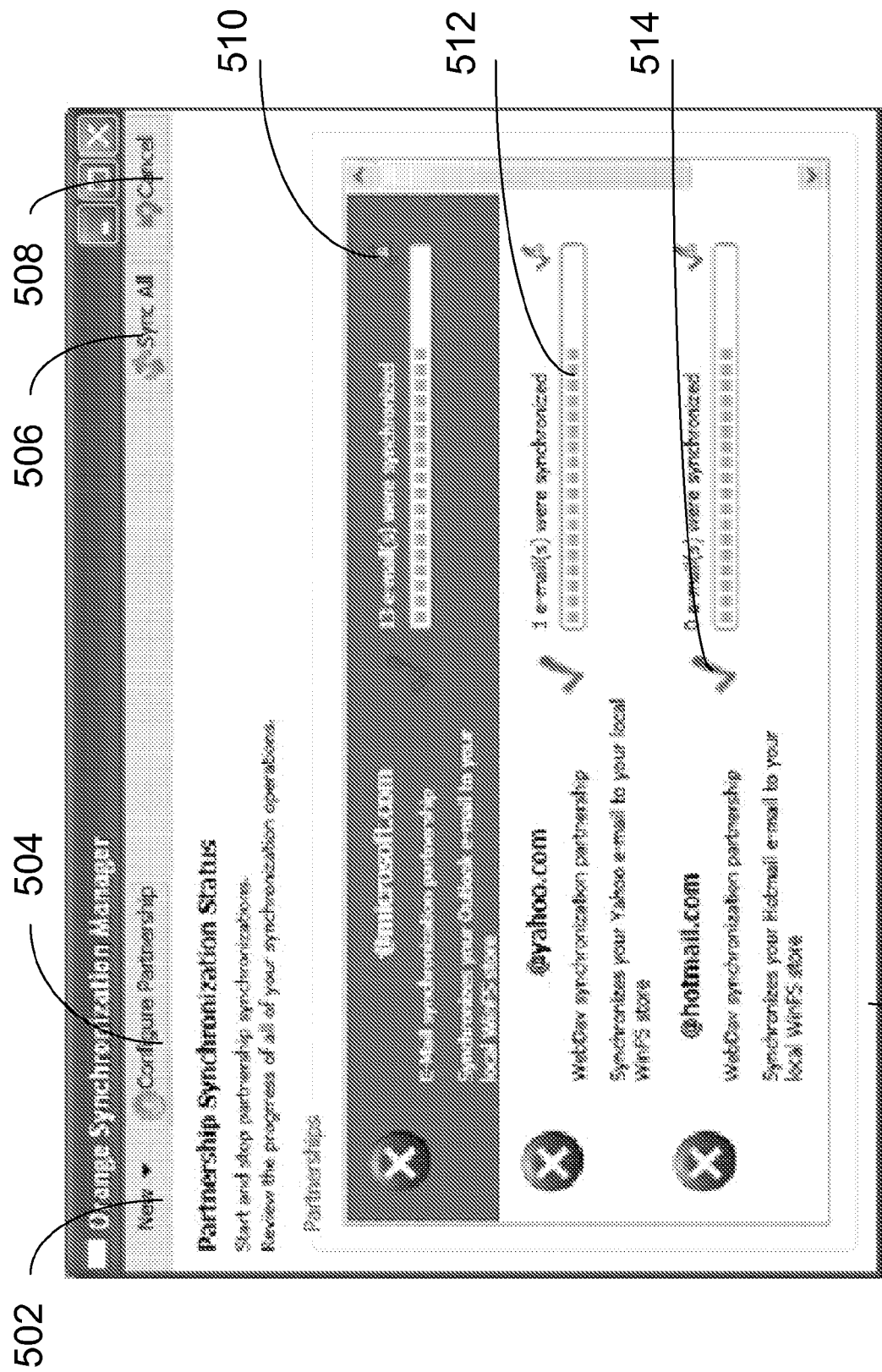
FIG. 5 is an illustrative example of a user interface for user interaction with a synchronization manager in accordance with at least one aspect of the present invention.

FIG. 5 represents one example of a user interface main window 500 for enabling interaction between a user and a synchronization manager in accordance with at least one aspect of the present invention. Illustrative functions in this window include: a new menu 502 that may be used to create partnerships, a configure partnership menu 504 that may be used to configure partnerships, a sync all button 506 that may be used to synchronize all partnerships, a cancel button 508 that may be used to cancel all synchronization operations, a plurality of pass/fail status symbols 510 that may be used to provide pass/fail results with respect to synchronization operations, a plurality of progress bars 512 that may be used to visually indicate the progress of synchronization operations, and a plurality of individual sync buttons 514 that may be used to initiate/cancel a single synchronization operation with respect to a given partnership.

Figure 6:
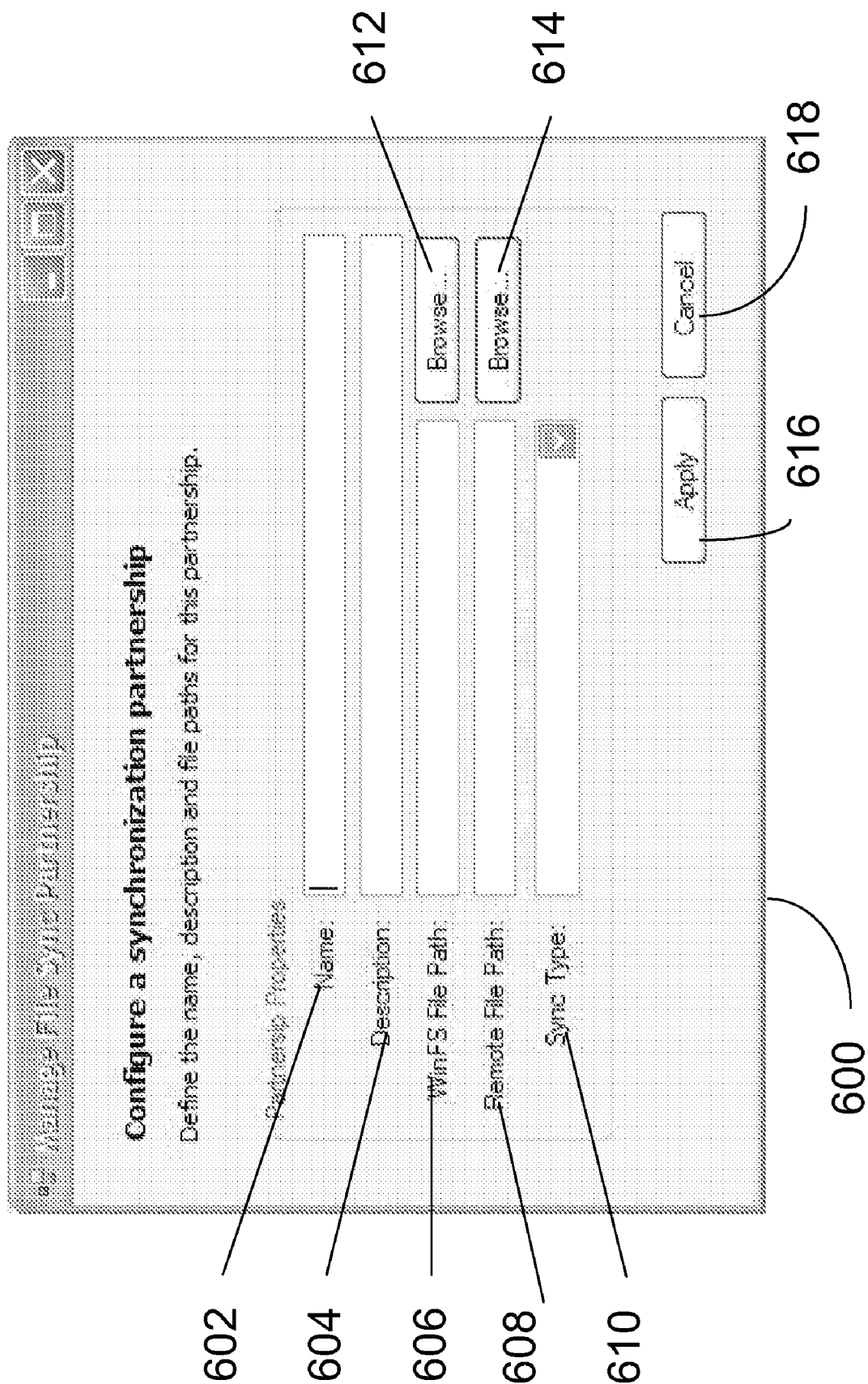
FIG. 6 is an example of an illustrative window enabling a user to create and configure a synchronization partnership in accordance with a synchronization manager in accordance with at least one aspect of the present invention.

FIG. 6 illustrates an example partnership creation window for enabling a user to create a partnership. The illustrative example pertains to a partnership to be created with respect to a file; however, the concepts as presented herein may readily be extended to include other such data and objects (e.g., email(s), contact information, calendar(s), document(s), etc.). As shown, the partnership creation window includes various fields, namely: "Name" 602, "Description" 604, "WinFS File Path" 606, "Remote File Path" 608, and "Sync Type" 610. After filling in the corresponding fields with appropriate information, a user may push Apply button 616 to confirm the selections or Cancel button 618 to cancel the selections. A local replica will be created on behalf of the user upon pushing Apply button 616. The name of the local replica will be determined by the value contained in "Name" field 602. "Description" field 604 provides a user an opportunity to incorporate a description and/or comments related to the partnership. It is envisioned that a user will use "Description" field 604 as a means to add a descriptive term, phrase, or mnemonic to more readily identify the partnership; however, the "Description" field 604 may be used for any descriptive purpose, such as application of a serial number to encode the partnership. "WinFS File Path" field 606 and corresponding "Browse . . . " button 612 are responsible for assigning the local replica beneath the location a user specifies. Similarly, "Remote File Path" field 608, in conjunction with its corresponding "Browse . . . " button 614, identifies the folder (e.g., the remote replica) that the local replica will be synchronized to. "Sync Type" field 610, shown as a drop-down menu, provides the user with an opportunity to specify how the synchronization will be conducted. More specifically, the user may choose in which direction the synchronization will take place.

For example, one type of synchronization may correspond to "Send Only," wherein changes made to the local replica are sent to the remote replica, but changes initiated in the remote replica are not sent to the local replica. Conversely, a "Receive Only" type of synchronization would be characterized by changes made to the remote replica being received by the local replica, but changes initiated by the local replica not being sent to the remote replica. A "Send and Receive" type of synchronization would enable synchronization to be initiated by a change in either replica. A fourth option may be presented to allow a user to "Disable" synchronization; this may be advantageous in situations where the user wants to maintain independence between data objects. For example, such independence may be desired where a user is attempting to formulate different versions of a data object, and will later choose which version is the best. The user may thereafter elect an active synchronization type in order to synchronize to the best version. It should be noted that the names of the various terms used herein are provided to facilitate description; alternative names may be used without departing from the scope of the invention.

It should be noted that the previous figures were presented by way of example, and not limitation. Alternative examples for the various windows are available and are well within the scope of the present invention. For example, the relative locations of the various fields within the given windows may be modified without loss of generality. Furthermore, the fields provided in the various windows may have associated with them one or more default values, wherein if a user fails to make a selection, a corresponding default value will be assumed. The user entry may be conducted via a combination of pushbutton selection (i.e., "Browse . . . " buttons 612 or 614), dropdown menus (e.g., "Sync Type" 610), keyboard/text entry, electronic inking or alternative methods of entry as have been established in the computer and electronic arts. Fields/functionality may also be extended without loss of generality. For example, a user may elect to establish a partnership based on metadata associated with one or more data objects, the metadata serving to indicate one or more properties associated with the data objects. In this manner, a user may form a partnership on the basis of properties associated with a given object above and beyond the name of the object itself.

As it pertains to the synchronization of the local and one or more remote replica, with particular specificity to "Send and Receive" type of synchronization, there may exist at various points in time a conflict between the local replica and one or more remote replica. Various resolution schemes may be adopted to respond to such conflict. For example, one such scheme might entail synchronizing to the latest modification. Such a scheme would likely incorporate a time-stamping feature in order to establish the latest occurring alteration. Another scheme might allow the replica to be ranked on a priority basis, thereby giving preference to modifications originating from the highest weighted replica.

In response to user selections, one or more error and/or status messages may be conveyed via the user display in order to communicate information related to initiated steps or operations. The breadth of the messages may range from a relatively high-level pass/fail status conveyance down to messages providing details that would instruct a user as to how to take corrective action, if necessary. The messages may be presented to the user simultaneously, or the messages may be presented in a sequential fashion, thereby encouraging a user to iteratively step through the series in a systematic manner.

Alternative examples may elect to incorporate extended user interface components that would enable one who wrote custom secondary schema to define one's own user interface elements. This would allow a user to tailor user interface components to a form suitable for one's specific application. Furthermore, a secondary schema, or various aspects of a secondary schema, may be able to be reused in one or more partnerships. Under such a scenario, a user library may effectively be established, thereby promoting reuse amongst the various entities.

Another aspect of the present invention may incorporate additional attributes with respect to a partnership so that synchronization is conducted on a more selective basis. For example, the partnership may be setup so that synchronization conducts itself automatically and/or at a periodic rate (e.g., once every hour, once every day, once a week, once a month, etc.). Alternatively, the partnership may be setup so that synchronization only executes upon a manual request to do so. In yet another example, the partnership may be setup to incorporate elements of manual and automatic synchronization. Furthermore, a partnership may establish selective synchronization on the basis of whether the partnership is visible to the rest of the system. For example, if a partnership is not visible to the system or a user, it may not be necessary to engage in a synchronization operation for a defined time period.

In accordance with another aspect of the present invention, entry into a partnership may have restrictions incorporated into it. For example, a property may be associated with a given object or partnership that restricts or allows membership into a given partnership and defines the access rights to be provided upon joining. Whether an object or partnership may be found may also be conditioned on one or more parameters. For privacy reasons, there may be an incentive to restrict access with respect to discovering whether a given object or partnership exists.

While illustrative systems and methods as described herein embodying various aspects of the present invention are shown, it will be understood by those skilled in the art, that the invention is not so limited. Modifications may be made by those skilled in the art, particularly in light of the foregoing teachings. It will also be appreciated and understood that modifications may be made without departing from the true spirit and scope of the present invention. The description is thus to be regarded as illustrative instead of restrictive on the present invention.

What is claimed is:

1. A computer-implemented method for synchronizing data objects having an application specific format without requiring the first application to register the configuration information with a centralized service, the method comprising:

a first application creating a partnership at a local location to facilitate synchronization between a first data object at the local location and a second data object at a remote location, wherein the first data object is formatted according to a first format corresponding to the first application, and wherein the partnership comprises a schema that describes the configuration information that is required to interpret the first data object in the first format such that by creating the partnership, the first application provides the configuration information without having to register the configuration information with a centralized service, wherein the first application includes a graphic user interface that consists of at least the following fields for receiving user input: a name field for specifying a name of the partnership, a local file path field for specifying the local location, a remote file path field for specifying the remote location, and a sync type field for specifying the type of synchronization to perform between the first and second data object;
a second application running at a remote location searching for the created partnership at the local location;
the second application discovering the created partnership and extracting the configuration information from the created partnership such that the second application receives the configuration information from the created partnership rather than receiving the configuration information from the centralized service; and
the second application using the configuration information from the created partnership to initiate, at the remote location, a synchronization operation to synchronize the second data object to the first data object, wherein the second application uses the configuration information to interpret the first data object in the first format.

2. The method of claim 1, further including creating a secondary schema to facilitate grouping the created partnership with additional partnerships.

3. The method of claim 1, wherein searching is based on at least one of: a name of the first data object, metadata associated with the first data object, a name of the created partnership, and a description of the created partnership.

4. The method of claim 1, further comprising synchronizing the second data object to the first data object using a selected synchronization type.

5. The method of claim 1, wherein synchronizing the second data object to the first data object includes resolving conflicts between the second data object and the first data object.

6. One or more computer storage media storing computer-executable instructions which, when executed on a computer system, perform a method for synchronizing data objects having an application specific format without requiring the first application to register the configuration information with a centralized service, the instructions comprising:
a first application creating a partnership at a local location to facilitate synchronization between a first data object at the local location and a second data object at a remote location, wherein the first data object is formatted according to a first format corresponding to the first application, and wherein the partnership comprises a schema that describes the configuration information that is required to interpret the first data object in the first format such that by creating the partnership, the first application provides the configuration information without having to register the configuration information with a centralized service, wherein the first application includes a graphic user interface that consists of at least the following fields for receiving user input: a name field for specifying a name of the partnership, a local file path field for specifying the local location, a remote file path field for specifying the remote location, and a sync type field for specifying the type of synchronization to perform between the first and second data object;
a second application running at a remote location searching for the created partnership at the local location;
the second application discovering the created partnership and extracting the configuration information from the created partnership such that the second application receives the configuration information from the created partnership rather than receiving the configuration information from the centralized service; and
the second application using the configuration information from the created partnership to initiate, at the remote location, a synchronization operation to synchronize the second data object to the first data object, wherein the second application uses the configuration information to interpret the first data object in the first format.

7. The computer storage media of claim 6, the method further including creating a secondary schema to facilitate grouping the created partnership with additional partnerships.

8. The computer storage media of claim 6, wherein the discovery is based on at least one of: a name of the first data object, metadata associated with the first data object, a name of the created partnership, and a description of the created partnership.

9. The computer storage media of claim 6, further comprising synchronizing the second data object to the first data object using a selected synchronization type.

10. The computer storage media of claim 6, wherein synchronizing the second data object to the first data object includes resolving conflicts between the second data object and the first data object.

11. A system in which one data object is synchronized with another data object having an application specific format without requiring the first application to register the configuration information with a centralized service, the system comprising:
a first computing system having a first data store which stores a first data object that is formatted according to a first format corresponding to a first application, and wherein the first data store also stores a partnership that is created by the first application to facilitate synchronization between the first data object and a second data object that is stored in a second data store on a second computing system, wherein the partnership comprises a schema that describes the configuration information that is required to interpret the first data object in the first format such that by creating the partnership, the first application provides the configuration information without having to register the configuration information with a centralized service, wherein the first application includes a graphic user interface that consists of at least the following fields for receiving user input: a name field for specifying a name of the partnership, a local file path field for specifying the local location, a remote file path field for specifying the remote location, and a sync type field for specifying the type of synchronization to perform between the first and second data object; and
the second computing system having the second data store which stores the second data object, wherein a second application on the second computing system performs the following steps to synchronize the second data object with the first data object:
searching for the created partnership on the first computing system;
discovering the created partnership and extracting the configuration information from the created partnership such that the second application receives the configuration information from the created partnership rather than receiving the configuration information from the centralized service; and
using the configuration information from the created partnership to initiate, at the remote location, a synchronization operation to synchronize the second data object to the first data object, wherein the second application uses the configuration information to interpret the first data object in the first format.

12. The system of claim 11, wherein the first data store also stores a secondary schema that is created by the first application to facilitate grouping the created partnership with additional partnerships.

13. The system of claim 11, wherein the discovery is based on at least one of: a name of the first data object, metadata associated with the first data object, a name of the created partnership, and a description of the created partnership.

14. The system of claim 11, further comprising synchronizing the second data object to the first data object using a selected synchronization type.

15. The system of claim 11, wherein synchronizing the second data object to the first data object includes resolving conflicts between the second data object and the first data object.

* * * * *